United States Patent [19]
Kondoh

[11] Patent Number: 5,226,154
[45] Date of Patent: Jul. 6, 1993

[54] DATA SAVING SYSTEM HAVING COUNTERS AS BLOCK CONTENT UPDATE IDENTIFIERS

[75] Inventor: Junichi Kondoh, Shiki, Japan

[73] Assignee: Kabushiki Kaisha Toshiba, Kawasaki, Japan

[21] Appl. No.: 442,200

[22] Filed: Nov. 28, 1989

[30] Foreign Application Priority Data

Nov. 30, 1988 [JP] Japan .............................. 63-302464

[51] Int. Cl.$^5$ .............................................. G06F 13/00
[52] U.S. Cl. ................................. 395/600; 364/246; 364/243.2; 364/DIG. 1; 364/243; 364/962.1; 364/964.6; 364/962; 364/964.3
[58] Field of Search .................... 364/DIG. 1, DIG. 2

[56] References Cited

U.S. PATENT DOCUMENTS

| | | | |
|---|---|---|---|
| 3,900,834 | 8/1975 | Casey et al. ...................... | 340/172.5 |
| 4,020,466 | 4/1977 | Cordi et al. ...................... | 340/172.5 |
| 4,168,541 | 9/1979 | Dekarske ............................. | 365/230 |
| 4,322,795 | 3/1982 | Lange et al. ...................... | 364/200 |
| 4,530,054 | 7/1985 | Hamstra et al. ................... | 364/200 |
| 4,651,307 | 3/1987 | Toumayan et al. ................ | 365/228 |

Primary Examiner—Gareth D. Shaw
Assistant Examiner—Lucien Toplu
Attorney, Agent, or Firm—Cushman, Darby & Cushman

[57] ABSTRACT

First and second counters are arranged in each file management section. The first counter is incremented in total saving or incremental saving. The second counter is set to be the same value as that of the first counter in total saving. A third counter is arranged in each block management portion. The third counter is set to be the same value as that of the first counter of the file management section when a corresponding block is updated. In incremental saving, only a block in which the value of the third counter is coincident with that of the first counter is saved in a second external storage medium. In since saving, only a block in which the value of the third counter is equal to or larger than that of the second counter is saved in the second external storage medium.

2 Claims, 8 Drawing Sheets

EXTERNAL STORAGE MEDIUM

DATA SAVING SYSTEM HAVING COUNTERS AS BLOCK CONTENT UPDATE IDENTIFIERS

BACKGROUND OF THE INVENTION

1. Field of the Invention

The present invention relates to a data saving system for saving data, which is stored in an external storage medium and is managed in units of files, in another external storage medium.

2. Related Art

Figure 1:
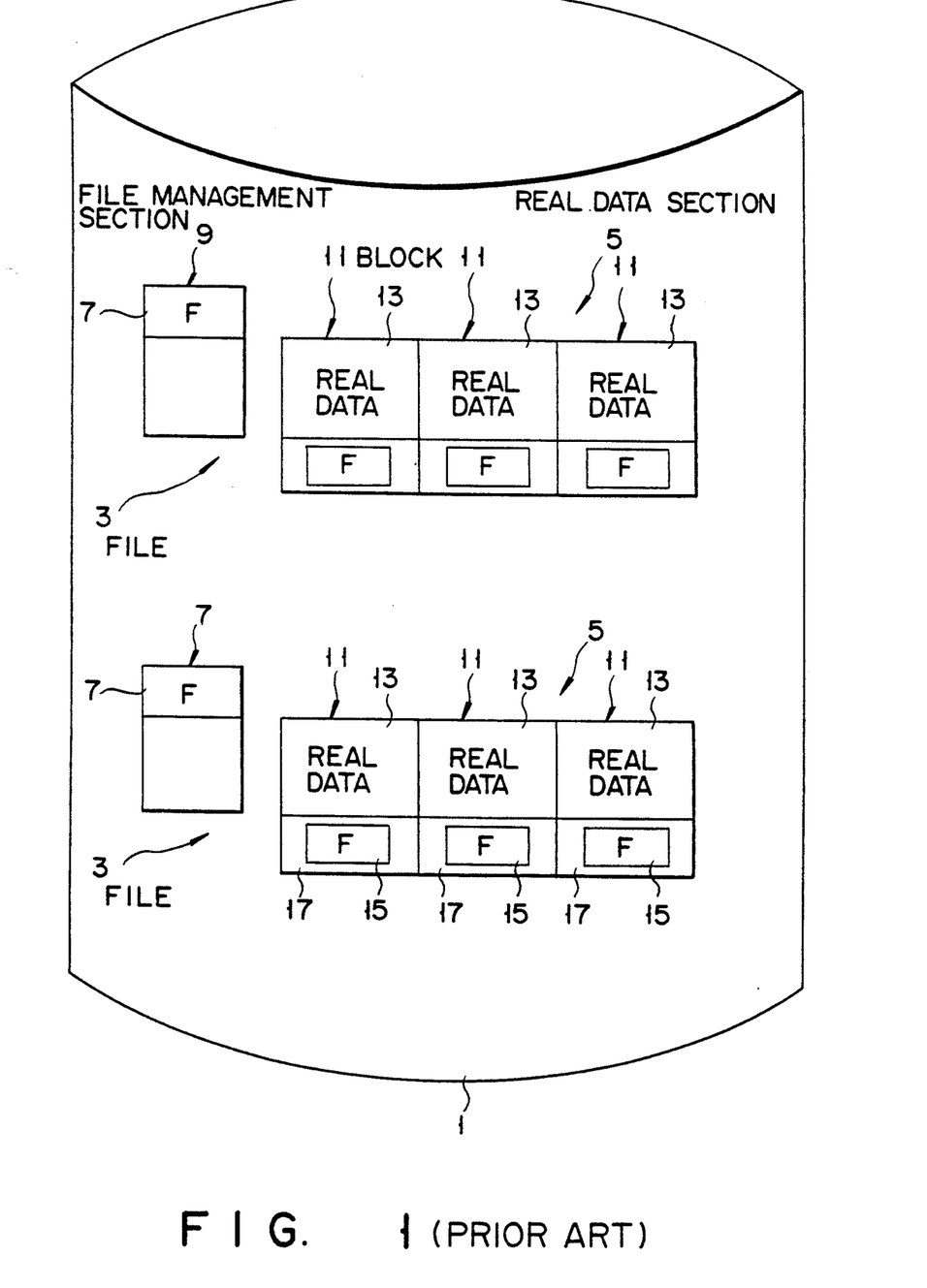
FIG. 1 is a view of a general format of data stored in an external storage medium.

Data to be stored in an external storage medium is generally managed in units of files, as shown in FIG. 1. Each file 3 stored in the external storage medium consists of a real data section 5 and a file management section 9 having management information (update flag) 7 for the real data section 5. The real data section 5 consists of at least one block. A block 11 consists of real data 13 and a block management portion 17 having management information (update flag) 15 for the real data 13. When data (file) 3 in an external storage medium 1 in FIG. 1 is to be updated, the data (file) 3 is read from the medium 1 into a main memory. The data is processed and updated in the main memory and is rewritten in the external storage medium 1. In this case, the update flag (F) 7 of the file management section 9 of the updated file 3 and the update flags (F) 15 of the block management portions 17 of the blocks 11 in the file 3 which are actually updated are set on so as to indicate the data update state in units of files and blocks.

Total saving, incremental saving, since saving, and the like are known as methods of saving updated data in another external storage medium. Generally, a combination of the total and incremental saving methods or a combination of the total and since saving methods is used.

Figure 2A:
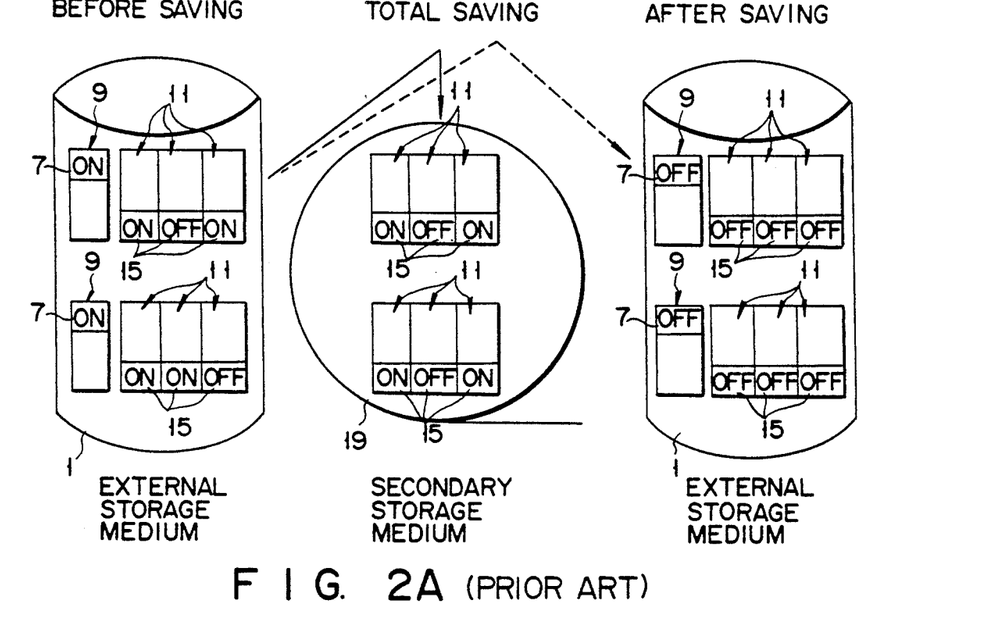
FIGS. 2A through 2C are views for explaining a conventional data saving operation in each data saving method.

In the total saving method, all the data are read in the main memory regardless of the states of the update flags 7 of the file management sections 9 and of the update flags 15 of the block management portions 17 shown in FIG. 1, and are saved in another external storage medium (to be referred to as a secondary storage medium hereinafter so as to discriminate it from the external storage medium 1) 19 through the main storage, as shown in FIG. 2A. In this case, ON update flags of the update flags 7 of the file management sections 9 and of the update flags 15 of the block management portions 17 must be changed into OFF update flags after saving, as shown in FIG. 2A. Therefore, write access requests are generated from the main memory to the external storage medium 1. In this case, the real data sections 5 are read in the main memory in units of blocks and are saved in the secondary storage medium. In addition, the update flags are set off in the main memory and are rewritten in the external storage medium 1 in units of blocks. These operations are performed for all the blocks. That is, data write in the secondary storage medium is performed by the number of times corresponding to the number of blocks constituting one file, and data rewrite in the external storage medium is performed by the number of times corresponding to the number of ON flags. By changing ON update flags into OFF update flags, a reference point of time for indicating the presence/absence of an update is always set at a point of time at which the latest saving operation is performed.

Figure 2B:
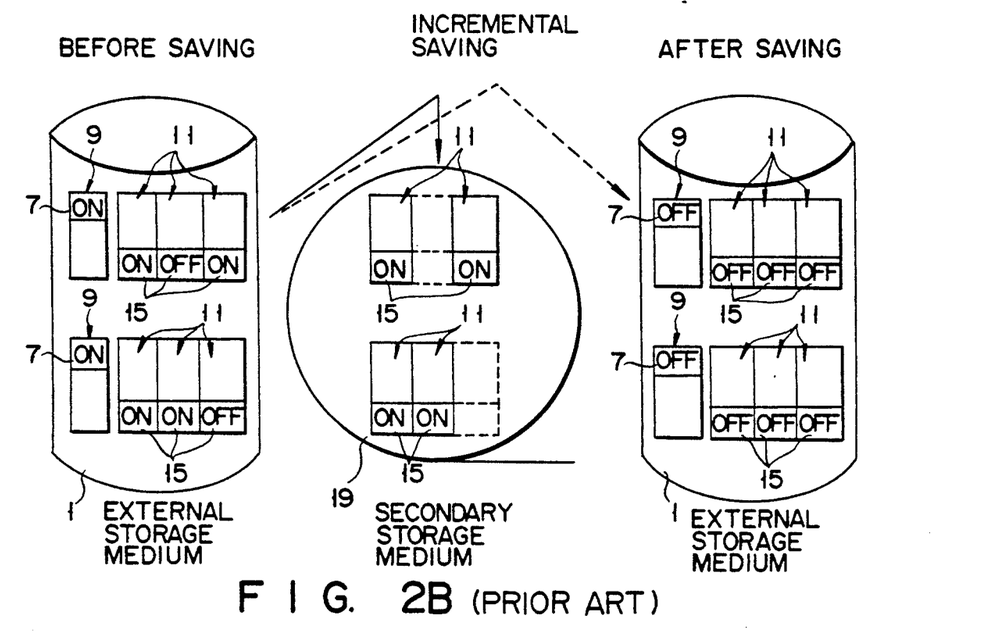

In the incremental saving method, only blocks 11 in which the update flags 15 of the block management portions 17 shown in FIG. 1 are set in an ON state are saved in the secondary storage medium 19 through the main memory, as shown in FIG. 2B. In this case, ON update flags of the update flags 7 of the file management sections 9 and of the update flags 15 of the block management portions 17 need to be changed into OFF update flags, as shown in FIG. 2B. Therefore, write access requests are generated from the main memory to the external storage medium 1 in the same manner as in the total saving method.

Figure 2C:
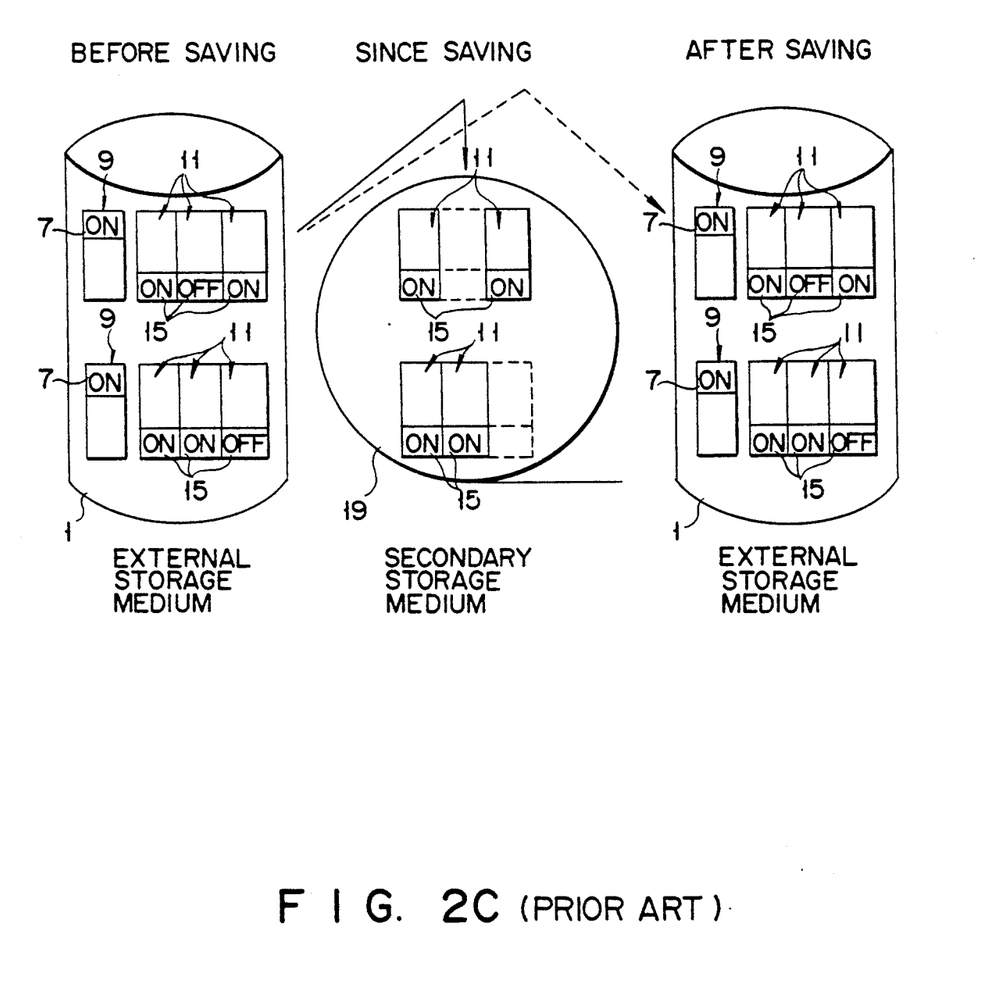

In the since saving method, only blocks of the blocks 11 in which the update flags 15 of the block management portions 17 shown in FIG. 1 are set in an ON state are saved in the secondary storage medium through the main memory, as shown in FIG. 2C. In the since saving method, however, as shown in FIG. 2C, rewriting of the update flags 7 of the file management sections 9 and the update flags 15 of the block management portions 17 in the external storage medium 1 is not performed. As a result, in the since saving method, a reference point of time for indicating the presence/absence of an update is set at a point of time at which the latest total saving operation is performed.

As described above, the incremental saving method or the since saving method is used in combination with the total saving method. For example, total saving is performed once a month, and since or incremental saving is performed once a week. A combination of total saving and incremental saving or since saving is selected by a user.

As described above, in incremental saving, a reference point of time for indicating presence/absence of an update is always set at a point of time at which the latest saving operation is performed (because ON update flags are changed into OFF update flags after saving). For this reason, blocks which are updated in the interval between the instant at which total saving is performed and the instant at which the next incremental saving is performed, or blocks which are updated in the interval between the instant at which incremental saving is performed and the instant at which the next incremental saving is performed are sequentially stored in the secondary storage medium. Therefore, if the incremental saving method is used in combination with the total saving method, restore processing is complicated and takes a long period of time. However, an advantage in this method is that the capacity of an external storage medium for saving can be reduced because only blocks which are updated after the latest saving operation is performed are saved.

In since saving, since no rewriting is performed with respect to update flags, a reference point of time for indicating the presence/absence of an update is set at a point of time at which the latest total saving is performed. Therefore, if the since saving method is used in combination with the total saving method, blocks which are updated after the latest total saving is performed must be saved. For this reason, the number of blocks to be saved is increased, and an external storage medium for saving needs to have a large capacity. However, an advantage in this method is that restore processing is simple and takes a relatively short period of time. Therefore, whether to use incremental saving or since saving, in combination with total saving, generally depends on a user's priority, i.e., the capacity of an external storage medium (secondary storage medium) for saving or a restore time. However, in the total saving method which is commonly used in any of the combinations, the update flags in the block management portions of all the saved blocks must be set off. For this reason, write processing must be frequently performed to write the contents of block management portions, having update flags which are set off in the main memory, in the original external storage medium. Hence, restore processing takes a long period of time. This drawback is also experienced in the incremental saving method.

SUMMARY OF THE INVENTION

It is an object of the present invention to provide a data saving system in which a reference point of time for indicating the presence/absence of an update can be clearly set on the basis of a difference in saving method without setting update flags in the block management portions in blocks and write processing in the block management portions of corresponding blocks in an external storage medium in total and incremental saving can be omitted.

According to a first aspect of the present invention, there is provided a data saving system for performing total saving in which all the data are saved, incremental saving in which only updated blocks are saved and a reference point of time for indicating the presence/absence of an update coincides with a point of time at which the latest saving operation is performed, and since saving in which only updated blocks are saved and a reference point of time for indicating the presence/absence of an update coincides with a point of time at which the latest total saving operation is performed, in saving a file consisting of a plurality of blocks, the data saving system having counters as block content update identifiers, comprising: first external storage means for storing data to be managed in units of files each consisting of a file management section and a real data section, the file management section including update flag means to be operated in accordance with a file update so as to indicate the presence of an update, first counter means to be incremented in total saving and incremental saving, second counter means which is set to be same value as that of the first counter means in total saving, the real data section consisting of real data and a block management portion, the block management portion including third counter means which is set to be the same value as that of the first counter means of the file management section when the real data is updated; second external storage means in which data stored in the first external storage means is saved; and saving means for saving all the blocks of a target file in the second external storage means and restoring an update flag in the file management section of the corresponding file in the first external storage means to a state indicating the absence of an update when total saving is performed, saving only a block, of blocks of a target file, in which a value of the third counter means in a block management portion is coincident with that of the first counter means in the file management section of the target file, in the second external storage means and restoring an update flag in a file management section of the corresponding file in the first external storage means to a state indicating the absence of an update when incremental saving is performed, and saving only a block, of blocks of a target file, in which a value of the third counter means of a block management portion is equal to or larger than that of the second counter means of the file management section of the target file, in the second external storage means when since saving is performed.

According to a second aspect of the present invention, there is provided a data saving method of performing total saving in which all the data are saved, incremental saving in which only updated blocks are saved and a reference point of time for indicating the presence/absence of an update coincides with a point of time at which the latest saving operation is performed, and since saving in which only updated blocks are saved and a reference point of time for indicating the presence/absence of an update coincides with a point of time at which the latest total saving operation is performed, in saving a file consisting of a plurality of blocks, comprising the steps of: operating an update flag in accordance with a file update so as to indicate the presence of an update; incrementing a first counter in total saving and incremental saving; setting a second counter to be same value as that of the first counter when total saving is performed; setting a third counter to be the same value as that of the first counter when the block is updated; saving all the blocks of a target file in a second external storage and restoring an update flag of the corresponding file in the first external storage to a state indicating the absence of an update when total saving is performed; saving only a block, of target blocks, in which a value of the third counter is coincident with that of the first counter, in the second external storage and restoring an update flag of the corresponding file in the first external storage to a state indicating the absence of an update when incremental saving is performed; and saving only a block, of target blocks, in which a value of the third counter is equal to or larger than that of the second counter, in the second external storage.

The first counter in each file management section is incremented only when total saving or incremental saving is performed. The second counter is operated only in total saving and is set to be the same value as that of the first counter. The third counter in each block management portion is operated only when the real data of a corresponding block is updated, and is set to be the same value as that of the first counter in the file management section. Therefore, a block, of the respective blocks of a target file, in which the value of the third counter in the block management portion is coincident with that of the first counter in the file management section of the target file is a block which is updated after the latest total saving operation or the latest incremental saving operation is performed, i.e., a target block to be subjected to incremental saving.

A block, of the respective blocks of a target file, in which the value of the third counter in the block management portion is equal to or larger than that of the second counter in the file management section in this file can be recognized as a block which is updated after the latest total saving operation is performed, i.e., a target block to be subjected to since saving. In addition, the above recognition can be obtained without using an update flag in a block management portion as in the conventional system. Therefore, rewrite processing in the block management portion for setting off the update flag upon saving is not necessary.

DETAILED DESCRIPTION OF THE PREFERRED EMBODIMENT

Figure 3:
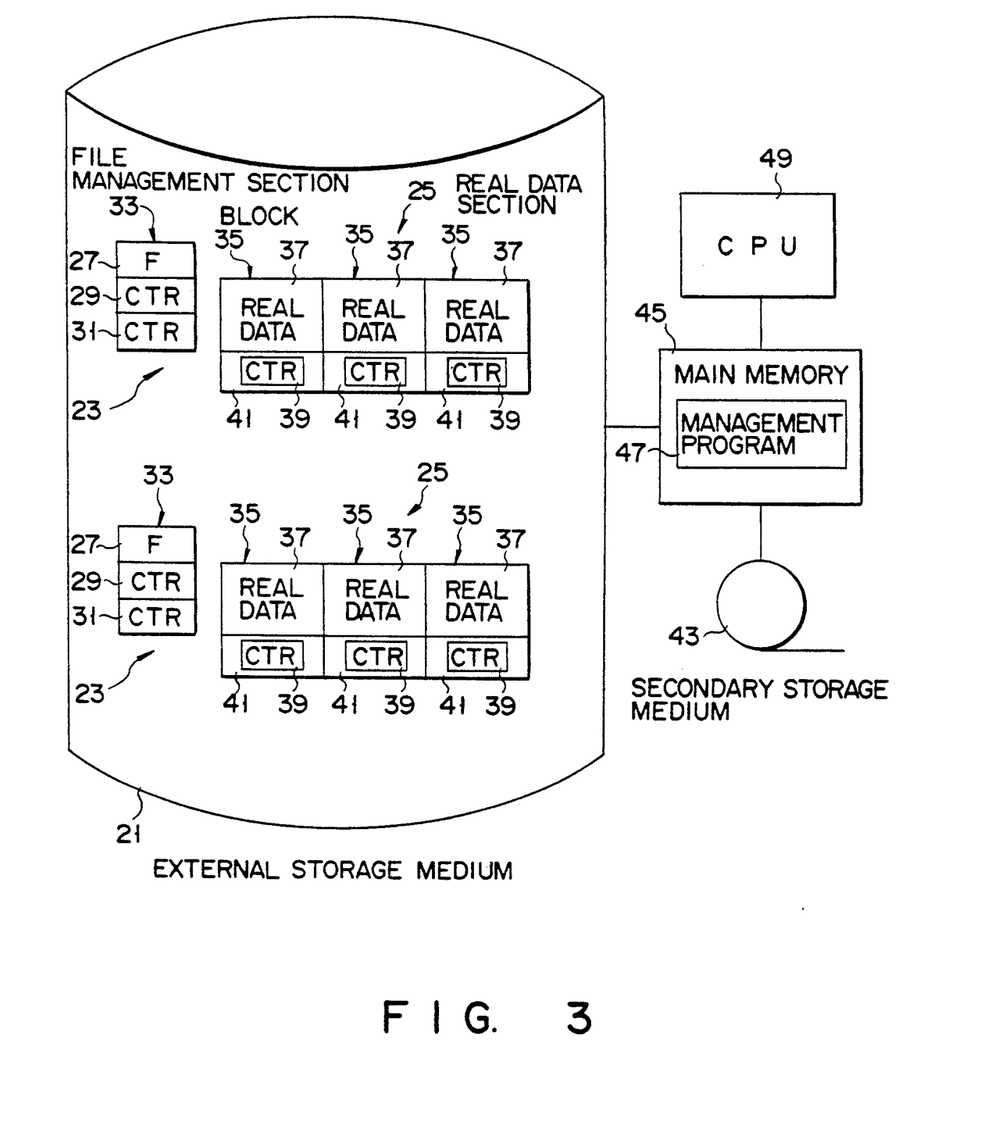
FIG. 3 is a block diagram showing an embodiment of a data processing system to which the present invention is applied.

FIG. 3 is a block diagram showing an embodiment of a data processing system to which the present invention is applied. Data stored in an external storage medium 21 such as a magnetic disk or an IC bulk is managed in units of files 23. Each file 23 consists of a real data section 25 and a file management section 33 having an update flag (F) 27 for providing management information for the real data section 25 and update counters (CTRs) 29 and 31. Each real data section 25 consists of at least one block 35. Each block 35 consists of real data 37 and a block management portion 41 having an update counter (CTR) 39 for providing management information for the real data 37.

Each update flag 27 is set in an ON state when an arbitrary block 35 in the real data section 25 of a corresponding file 23 is updated, and is restored to an OFF state only when total or incremental saving, among the three saving methods, i.e., total saving, incremental saving, and since saving, is performed. Each update counter 29 is incremented by one only when either total or incremental saving is performed. Each update counter 31 is operated only in total saving and is set to be same value as that of a corresponding update counter 39. Each update counter 39 is set to be same value as that of the update counter 29 in the file management section 33 of a corresponding file 23 only when a corresponding block 35 is updated.

An external storage medium 43 (to be referred to as a secondary storage medium hereinafter so as to discriminate it from the external storage medium 21) is constituted by a magnetic tape or a floppy disk for recording (saving) data of the external storage medium 21. A main memory 45 stores various programs, data, and the like. A management program 47 is stored in the main memory 45 so as to control a processing sequence for saving data of the external storage medium 21 in the secondary storage medium 43. A CPU 49 controls the overall system in accordance with various programs in the main memory 45. A data saving operation of the data saving system shown in FIG. 3 will be described below with reference to FIGS. 4A and 4B and FIGS. 5A through 5C.

Figure 4A:
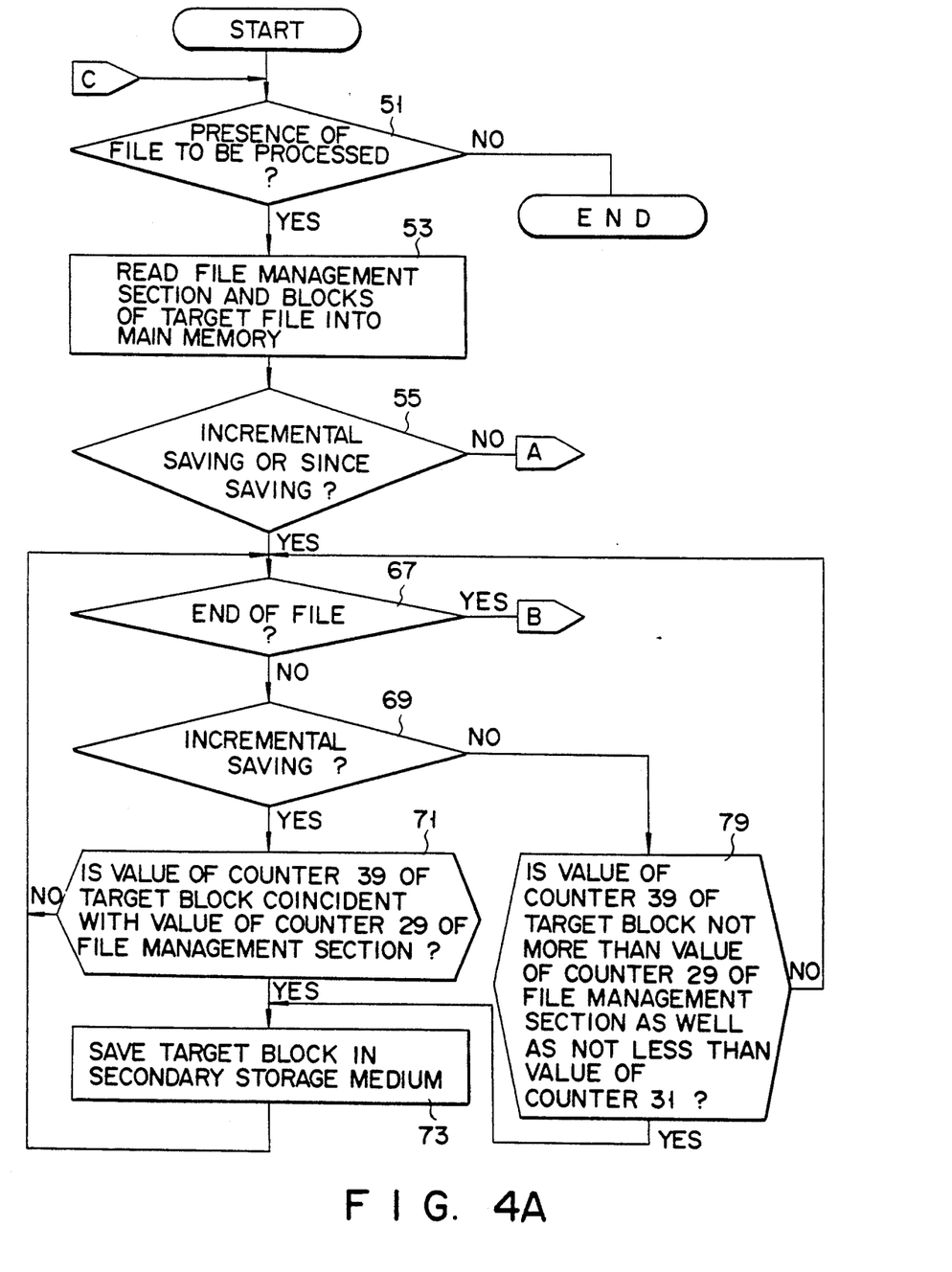
FIGS. 4A and 4B are flow charts showing a data saving sequence in the system shown in FIG. 3.

When files 23 in the external storage medium 21 are to be saved in the secondary storage medium 43, the CPU 49 operates in accordance with the management program in the main memory 45. More specifically, when the CPU 49 determines in step 51 that a file 23 to be processed is present, it reads the file management section 33 of the target file 23 into the main memory 45 in step 53. In step 55, the CPU 49 checks whether incremental or since saving is requested. If NO in step 55, the CPU 49 directly saves all the blocks 35 of the target file 23, which was read into the main memory 45, in the secondary storage medium 43 in steps 57 and 59. Upon completion of the above saving operation, the CPU 49 increments by one the content of the update counter 29 in the file management section 33, which was read into the main memory 45, and sets the incremented value of the update counter 29, in the update counter 31 in the same file management section 33, in total saving, in step 63.

Figure 5A:
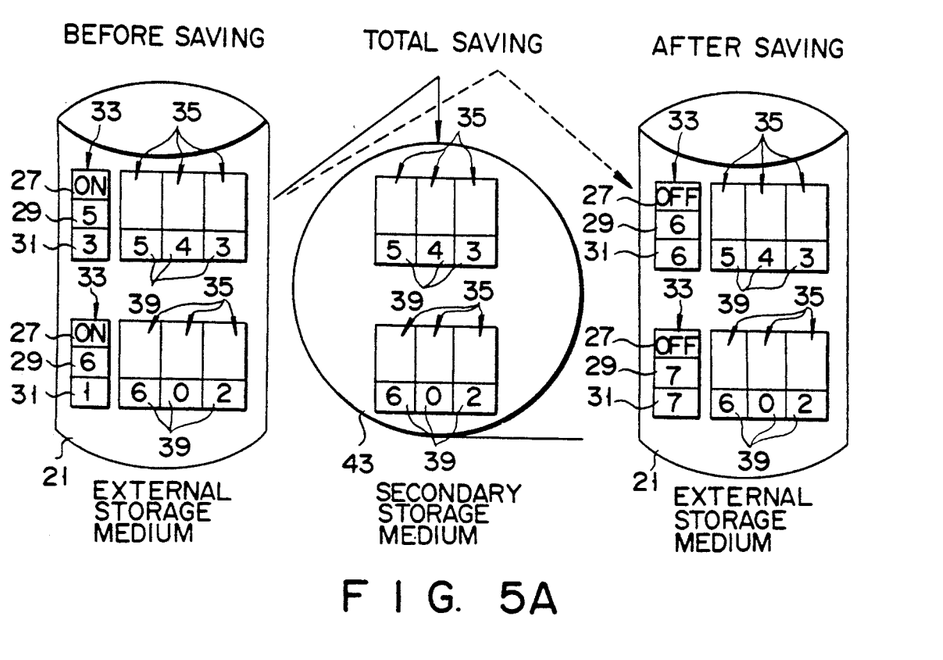
FIGS. 5A through 5C are views for explaining a data saving operation based on the flow charts in FIGS. 4A and 4B in each data saving method.

In step 65, the CPU 49 sets off the update flag 27 in the same file management section 33, and rewrites the contents of the file management section 33 in the main memory 45, which has the update flag 27 and the update counters 29 and 31 having the same value, into the external storage medium 21. The CPU 49 repeats the above-described operation until no target file is present. FIG. 5A shows a state of total saving.

An operation in incremental saving will be described below.

Figure 4B:
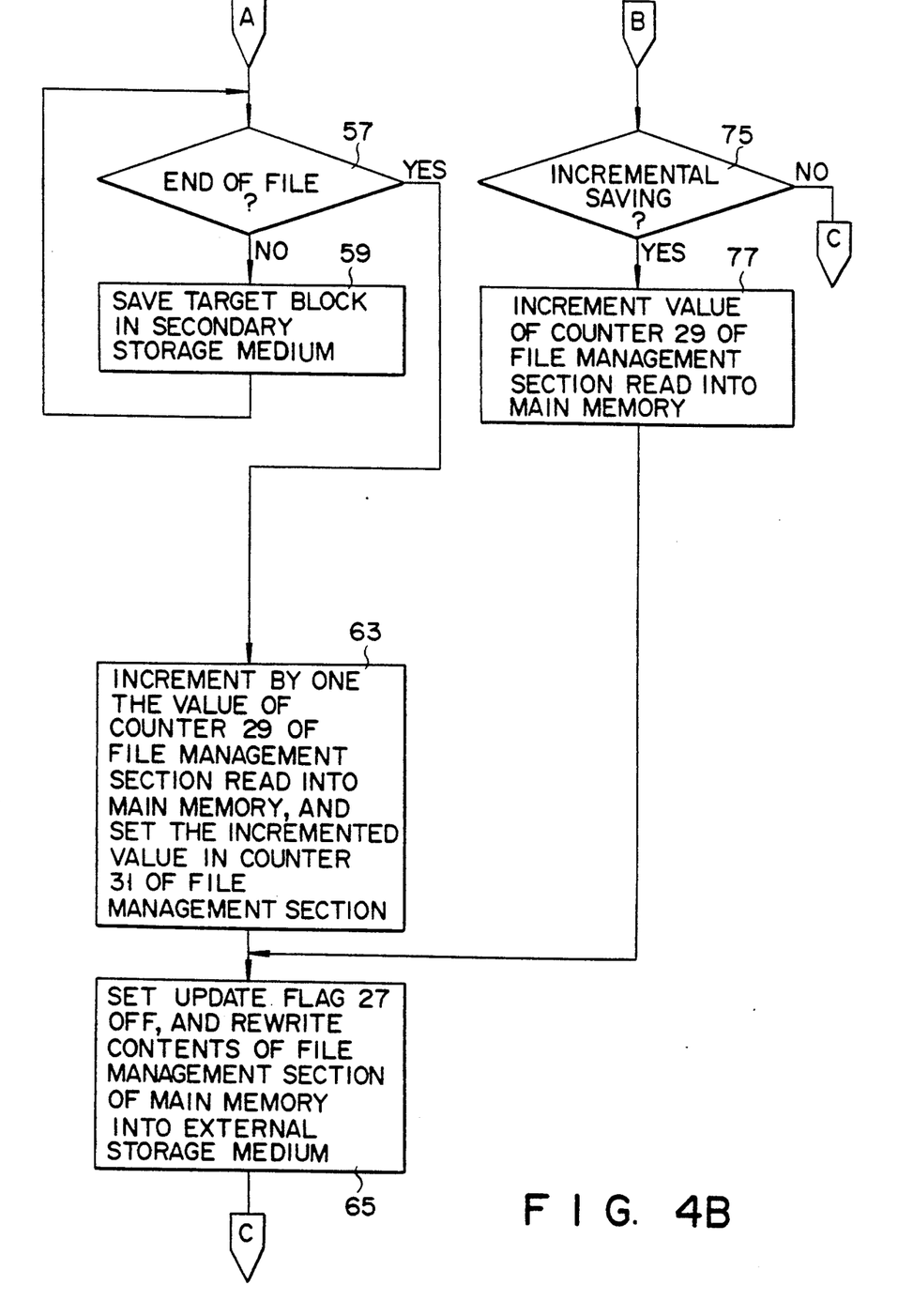

When the CPU 49 determines in step 55 that incremental saving is required, the flow advances to step 71 through steps 67 and 69. In step 71, the CPU 49 checks whether the value of the update counter 39 of the block management portion 41 of a block 35 (to be saved) in a target file 23 is coincident with that of the update counter 29 of the file management section 33 in the same file 23.

The update counter 39 of each block management portion 41 is set to be the same value as that of the update counter 29 of a corresponding management section 33 when a corresponding block 35 is updated. Each update counter 29 is incremented by one only when a corresponding file 23 is subjected to total saving or incremental saving. A block 35 having an update counter 39 whose value is coincident with that of a corresponding update counter 29 is a block which is updated after the latest total or incremental saving is performed. That is, such a block is a target block to be subjected to incremental saving. When the CPU 49 determines in step 71 that the value of the update counter 39 is coincident with that of the update counter 29, it saves the corresponding block 35 in the secondary storage medium 43 in step 73.

As described above, according to the present invention, a target block to be subjected to incremental saving can be recognized by simply comparing the value of the update counter 39 of a corresponding block management portion 41 with that of the update counter 29 in a corresponding file management section 33 without setting an update flag in the block management portion 41 as in the conventional system. Therefore, the update flag in each block management portion used as a reference for recognizing a block which is updated immediately before saving (i.e., a target block to be saved) in the conventional system can be omitted, thus requiring no cumbersome operation of setting off the update flag of a target block and rewriting it in the external storage medium 21 upon incremental saving (similarly, upon total saving described above).

The CPU 49 sequentially performs the determination operation in step 71 for all the blocks 35 of the target file 23, and saves only blocks for which YES is determined, i.e., only blocks, in which the value of the update counter 39 of the block management portion 41 is coincident with that of the update counter 29 of a corresponding file management section 33, in the secondary storage medium in step 73.

Figure 5B:
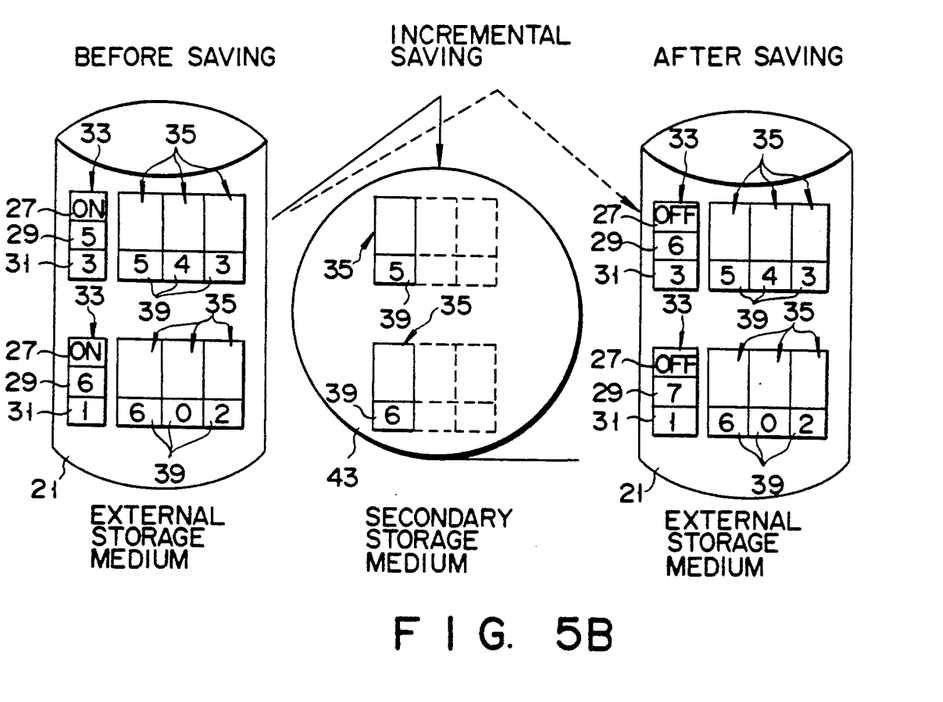

When the CPU 49 completes the above-described saving operation, the flow advances to step 75 through step 67. If incremental saving is requested as in this case, the flow advances to step 77 so as to increment by one only the content of the update counter 29 in the file management section 33 read into the main memory 45. Subsequently, the CPU 49 sets off the update flag 27 in the same file management section 33 in step 65 in the same manner as in total saving, and rewrites the contents of the file management section 33 in the main memory 45, which has the update flag 27, the incremented update counter 29, and the update counter 31 having the same value as that before the saving operation, into the external storage medium 21. The CPU 49 repeats the above-described operation until no target file is present. FIG. 5B shows a state of this incremental saving.

An operation in since saving will be described below.

When since saving is requested, the flow advances from step 69 to step 79. In step 79, the CPU 49 checks whether the value of the update counter 39 of the block management portion 41 of a block 35 (to be saved) in a target file 23 is equal to or smaller than that of the update counter 29 of the file management section 33 of the same file 23 and is equal to or larger than that of the update counter 31. The content of the update counter 31 is updated to the content of the update counter 29 only when total saving is performed, and the content of the update counter 39 is updated to the content of the update counter 29 when the corresponding block is updated. Therefore, the content of the update counter 39 of the updated block is equal to or larger than that of the corresponding update counter 31.

If YES in step 79, the flow advances to step 73 and the CPU 49 saves the corresponding block in the secondary storage medium 43. The CPU 49 sequentially performs the determination operation in step 79 with respect to all the blocks of the target file 23. The CPU 49 saves only blocks 35 for which YES is obtained in step 79, i.e., only blocks 35, in which the value of the update counter 39 of the block management portion 41 is equal to or smaller than that of the update counter 29 of a corresponding file management section 33 and is equal to or larger than that of a corresponding update counter 31, in the secondary storage medium 43.

Figure 5C:
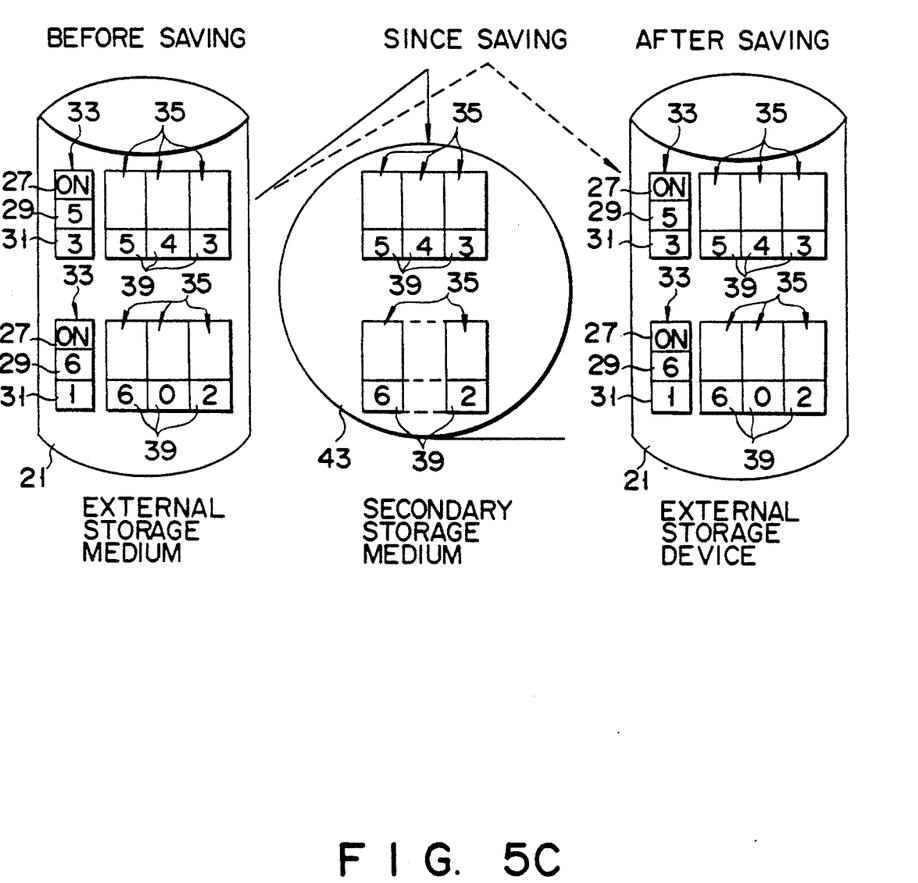

Upon completion of the above saving operation, the CPU 49 performs no block rewriting operation in the external storage medium 21 as in the conventional system when since saving is performed as in this case, and returns to processing for the next file. The CPU 49 repeats the above-described operation until no target file is present. FIG. 5C shows a state of this since saving.

As is apparent from the above description on the data saving operations in the three saving methods, in this embodiment, the update counter 29 of the file management section 33 of a target file 23 in the external storage medium 21 is incremented by one in total saving and incremental saving. The update counter 31 of the file management section 33 is set to be the same value as that of the update counter 29 in total saving. The update counter 29 is not operated in since saving. The update counter 31 is not operated in incremental saving and since saving. The update counter 39 of the block management portion 41 of a target block 35 of the file 23 is operated when the target block 35 is updated, and is set to be the same value as that of the update counter 29 of the file management section 33 of the same file 23.

Consequently, blocks, of the blocks 35 of the target file 23, in which the value of the update counter 39 of the block management portion 41 is coincident with that of the update counter 29 of the file management section 33 of the same file 23, are blocks which are updated after the latest total saving or the latest incremental saving is performed, i.e., target blocks to be subjected to incremental saving. Therefore, the above-described incremental saving can be properly executed. In addition, blocks, of the blocks 35 of the target file 23, in which the value of the update counter 39 of the block management portion 41 is equal to or larger than that of the update counter 31 of the file management section 33 of the same file 23 are blocks which are updated after the latest total saving is performed, i.e., target blocks to be subjected to since saving. Therefore, the above-described since saving can be properly executed.

Furthermore, according to this embodiment, a combination of the incremental and since saving methods, which cannot be used in the conventional system, can be used as follows. An operation based on this method will be described below with reference to FIG. 3. In the conventional system, an update flag is required in each block management portion 41 so as to indicate the presence/absence of a block update. In this case, once data saving is performed by the incremental saving method, the point of time at which this saving is performed is set to be a reference point of time for indicating the presence/absence of a block update, and hence the update flag in the block management portion 41 is set off. For this reason, even if data saving is required to be performed by the since saving method after the above operation, a point of time for since saving cannot be recognized. Hence, the increment and since saving methods cannot be used in combination in the conventional system. In contrast to this, according to this embodiment, in incremental saving, target blocks can be properly recognized by referring to the update counter 39 in the block management portion 41 of each target block 35, which is set in place of an update flag in the conventional system, and the update counters 29 and 31 of a corresponding file management section 33. Therefore, both the saving methods can be used in combination.

What is claimed is:

1. A data saving system for saving a file comprising a plurality of blocks, operating selectively in one of the following modes: a total saving mode in which all of said plurality of blocks are saved; an incremental saving mode in which only blocks in said plurality of blocks which have been updated since a previous saving operation are saved; and a since saving mode in which only blocks in said plurality of blocks which have been updated since a previous total saving operation are saved, said data saving system having counters as content update identifiers and comprising:
first external storage means for storing data to be managed in units of files, each of said files comprising a file management section and a real data section, said file management section including first count storage means for incrementing a stored value to count total saving and incremental saving operations and second count storage means for storing a value representing a first counter value from said first count storage means when said total saving operation is performed, said real data section including real data and a block management portion, said block management portion including third count storage means for storing a value representing a first counter value from said first count storage means when said real data is updated;

a second external storage in which data stored in said first external storage means is saved; and saving means for: saving all blocks of a target file in said second external storage when total saving is performed; saving, in said second external storage, only those blocks, of blocks of a target file, in which the value of said third count storage means is equal to the value of said first count storage means in said file management section of said target file when incremental saving is performed; and saving, in said second external storage means, only those blocks, of blocks of a target file, in which the value of said third count storage means in a block management portion of said block is not less than that of said second count storage means of said fie management section of said target file when said since saving is performed.

2. A data saving method of saving a file comprising data arranged in a plurality of blocks, operating selectively in one of the following modes: a total saving mode in which all of said data are saved; an incremental saving mode in which only data in said plurality of blocks which have been updated since a previous saving operation are saved; and a since saving mode in which only data in said plurality of blocks which have been updated since a previous total saving operation are saved, said method comprising the steps of:

incrementing a first counter responsive to total saving and incremental saving operations to store a value therein;

setting a value in a second counter equal to that of said first counter when a total saving operation is performed;

setting a value in a third counter equal to that of said first counter when a block in said plurality of blocks is updated, said third counter corresponding to said updated block;

saving all blocks of a target file in a first external storage to a second external storage when a total saving mode operation is performed;

saving, in said second external storage, only a block, of target blocks in said plurality of blocks, in which the value in said third counter is equal to said value in said first counter when an incremental saving mode operation is performed; and saving, in said second external storage, only a block, of target blocks in said plurality of blocks, in which the value in said third counter is not less than the value in said second counter when a since saving mode operation is performed.

* * * * *